G. E. Sutphen.
Revolving Rake.

No. 84,777. Patented Dec. 8, 1868.

Witnesses

Inventor
G. E. Sutphen by his
attys. M. Randolph & Co.

GEORGE E. SUTPHEN, OF LOUISIANA, MISSOURI.

Letters Patent No. 84,777, dated December 8, 1868.

IMPROVEMENT IN HORSE-RAKES.

The Schedule referred to in these Letters Patent and making part of the same.

*To all whom it may concern:*

Be it known that I, GEORGE E. SUTPHEN, of Louisiana, in the county of Pike, and State of Missouri, have made certain new and useful Improvements in Horse Hay-Rakes; and I do hereby declare that the following is a full and clear description thereof, reference being had to the accompanying drawings, and to the letters of reference marked thereon.

This invention relates to an adjustable prop, arranged to fall upon the rear teeth of a revolving horse-rake and hold the rake from revolving over with its load of hay, until the proper place for dumping the same shall have been reached.

The prop is pivoted to the handle of the rake, and is withdrawn from the teeth by means of a connecting-rod and lever, also attached to a handle of the rake, and it is thrown forward into its position on the teeth by the action of a spring.

This device may be applied to a single or a double-handled hay-rake.

To enable those skilled in the art to make and use my improved hay-rake, I will proceed to describe its construction and operation, as applied to a single-handled rake.

Figure 1:
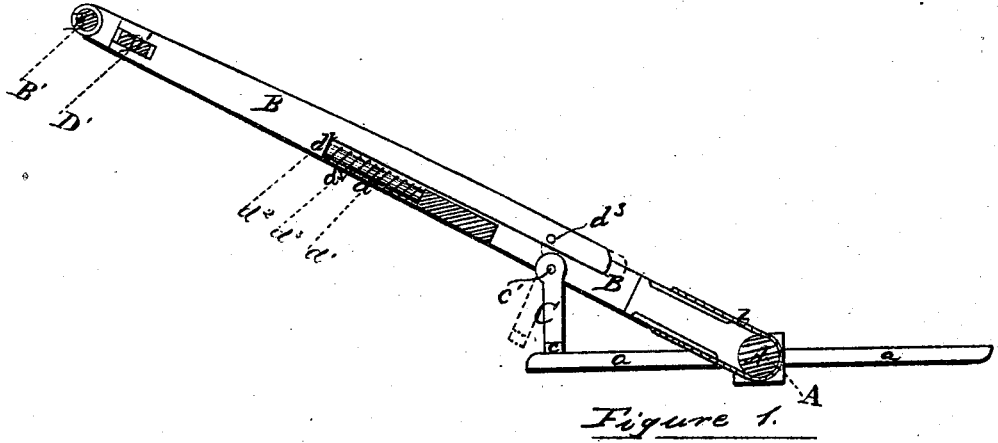

Figure 1, of the drawings, is a central sectional elevation of the improved hay-rake.

Figure 2:
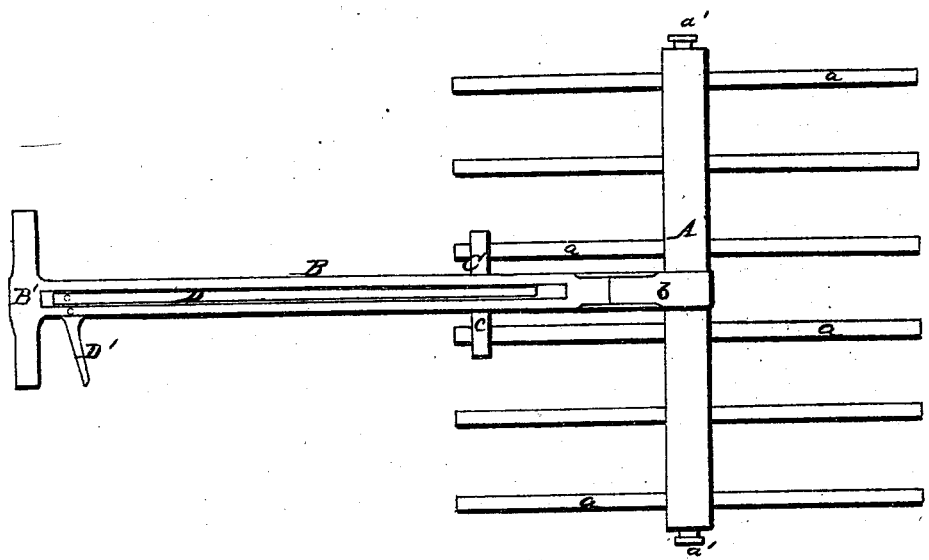

Figure 2 is a plan of the same.

The rake-head A and the teeth $a$ are of the usual construction, and the traces or other traction-attachments of the team are to be hitched to the round pins $a'$, at the ends of the head-piece A, and the attachment of these parts is such as to readily allow the rake to roll over or revolve, as in rakes now in use.

There may be one or two of the handles B attached to the rake-head by means of the strap $b$, which surrounds the head-piece loosely, so as to allow it to revolve.

Pivoted to the handle B is a prop, C, having a foot-piece, $c$, long enough to lap over two of the rake-teeth $a$, and lying in a plane parallel with the rake-head.

The prop C is pivoted to the handle B by means of the fulcrum-pin $c'$.

The connecting-rod D is placed, either in the slot prepared for it in the handle B, or, it may be, by the side of the said handle. In either case, a lever, D', is placed just inside of the head-piece B' of the handle, and pivoted at $d$ to the handle B, the outer end of the lever D' being in sufficiently close proximity to the said head-piece to allow the operator to grasp both pieces with one hand.

A spring, $d^1$, located upon a small rod, $d^3$, as shown, is arranged to press against the seat $d^2$ of the rod D, which latter is constructed with a socket which passes down over the rod $d^3$ when the lever D' is operated.

By means of this arrangement the connecting-rod D and the prop-piece C, which is pivoted to its lower end at $d^3$, are forced into such a position as to hold the foot-piece $c$ habitually on the ends of the teeth $a$, and thereby prevent the rake from turning over until the operator desires it to do so.

Whenever it is desired to turn the rake over, the driver will pull the outer end of the lever D' back toward the head-piece B', and the said lever, acting through the medium of the rod D on the prop, will withdraw its foot-piece from the rake-teeth, as indicated by the red lines in fig. 1, and allow the rake to roll over.

Immediately on releasing the end of the lever, the spring $d^1$ will cause the above-described operative parts to resume their normal condition, and the foot $c$ to arrest the other set of rake-teeth, as they come under its hold.

The head-piece B' will serve as a handle, by which the operator can readily draw the rake backward, and will afford valuable assistance to the driver in operating the lever D'.

Having described my invention,

What I claim, is—

The connecting-rod D, with seat $d^2$, when used in connection with spring $d^1$ upon rod $d^3$, as shown and described, and combined with the prop C, having the foot-piece $c$, and lever D', the whole being operated, in connection with the handle B and rake A, as and for the purposes described.

GEO. E. SUTPHEN.

Witnesses:
M. RANDOLPH,
GEO. P. HERTHEL, Jr.